United States Patent
Suijver et al.

(10) Patent No.: US 8,233,221 B2
(45) Date of Patent: Jul. 31, 2012

(54) ADJUSTABLE LENS SYSTEM FOR REAL-TIME APPLICATIONS

(75) Inventors: Jan Frederik Suijver, Dommelen (NL); Christopher Stephen Hall, Hopewell Junction, NY (US); Anna Teresa Fernandez, Falls Church, VA (US); Stein Kuiper, Neerijnen (NL); Yan Shi, White Plains, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 234 days.

(21) Appl. No.: 12/742,658

(22) PCT Filed: Dec. 10, 2008

(86) PCT No.: PCT/IB2008/055205
§ 371 (c)(1),
(2), (4) Date: May 13, 2010

(87) PCT Pub. No.: WO2009/077939
PCT Pub. Date: Jun. 25, 2009

(65) Prior Publication Data
US 2010/0259832 A1  Oct. 14, 2010

Related U.S. Application Data

(60) Provisional application No. 61/013,836, filed on Dec. 14, 2007.

(51) Int. Cl.
G02B 1/06 (2006.01)
G02B 3/12 (2006.01)
(52) U.S. Cl. .................. 359/665; 359/666; 359/667
(58) Field of Classification Search ........... 359/665–667
See application file for complete search history.

(56) References Cited

U.S. PATENT DOCUMENTS 7,570,434 B2 * 8/2009 Kuiper et al. ............... 359/665
(Continued)

FOREIGN PATENT DOCUMENTS

WO  WO03069380 A1  8/2003
(Continued)

OTHER PUBLICATIONS

S. Kuiper et al., "Variable-Focus Liquid Lens for Miniature Cameras", App. Phy. Lett., 85(7), Aug. 2004, pp. 1128-1130.
(Continued)

*Primary Examiner* — Evelyn A. Lester

(57) ABSTRACT

An adjustable fluid type lens system is provided that allows e.g. ultrasound imaging through the lens during adjustment of the lens. The lens includes a container enclosing two immiscible fluids, e.g. water and oil, being in contact with each other at an interface. Incoming waves are then refracted at this interface. The shape of the interface, and thereby the refraction property, is adjustable by adjusting a voltage applied to the lens. The two fluids are selected such that they together exhibit a mechanical damping which is critical or near critical. A control circuit generates the electric voltage for adjusting the refraction from one value to another, the control circuit being arranged to change the electric voltage such that a rate of voltage change is limited to avoid oscillation of the interface, thereby adjusting refraction of incoming waves at the interface in a continuous manner. This makes it possible to use the lens while it is during adjustment from one refraction value to another, since the interface shape will at all time during the adjustment have a controlled shape. The voltage can be either a continuous voltage or a discrete stepwise (digital) voltage which is just controlled with respect to step size and temporal extension of the steps. The lens system has a number of applications e.g. within the medical field, e.g. for 'on the fly' high speed ultrasound imaging, or for ultrasound ablation applications where ablation can be performed during adjustment of the lens to follow a pre-defined trajectory.

15 Claims, 3 Drawing Sheets

U.S. PATENT DOCUMENTS

| | | |
|---|---|---|
| 2004/0036483 A1 | 2/2004 | Borwick, III et al. |
| 2007/0146893 A1 | 6/2007 | Kuiper et al. |

FOREIGN PATENT DOCUMENTS

| | | |
|---|---|---|
| WO | WO2005071447 A1 | 8/2005 |
| WO | WO2006013541 A1 | 2/2006 |
| WO | WO2006030328 A1 | 3/2006 |
| WO | WO2006051437 A1 | 5/2006 |

OTHER PUBLICATIONS

S. Kuiper et al., "Variable-Focus Liquid Lens for Portable Applications", Proceed. of the SPIE, Bellingham, VA, US, vol. 5523, No. 1, Aug. 2004, pp. 100-109.

C. Gabay et al., "Dynamic Study of a Varioptic Variable Focal Lens", Proceed. of the SPIE, Bellingham, VA, US, vol. 4767, Jan. 1, 2002, pp. 159-165.

* cited by examiner

ADJUSTABLE LENS SYSTEM FOR REAL-TIME APPLICATIONS

CROSS REFERENCE TO RELATED CASES

Applicants claim the benefit of International Application Number PCT/IB2008/055205, filed Dec. 10, 2008, and Provisional Application Ser. No. 61/013,836, filed Dec. 14, 2007.

FIELD OF THE INVENTION

The invention relates to the field of lens systems, more specifically the invention relates to the field of adjustable lens systems based on refraction at an interface between two fluids.

BACKGROUND OF THE INVENTION

Adjustable lens systems for medical imaging or treatment applications are known, e.g. lens systems arranged for adjusting refraction of ultrasound. So-called fluid lenses or liquid lenses as described in WO 2003/069380 by Philips can be used for such applications. In essence, fluid lens technology allows light, or other rays or waves, to be refracted through alterations in physical boundaries of a fluid filled cavity with specific refractive indices. This process is known as electrowetting, whereby the fluid within the cavity is moved by the application of a voltage across conductive electrodes, thus accomplishing a movement of the surface of the fluid. This change in surface topology allows waves to be refracted in such a way to alter the travel path to cause focusing or refracting to a desired location.

However, it is a well known problem with fluid type lenses, that rapid adjustment of the lens will cause the fluids to oscillate, thereby causing the refractive interface between the fluids to take uncontrollable shapes during the adjustment until the oscillations die out and the interface has changed to another stable shape. This means that real-time high quality imaging through such lens during the adjustment will be heavily blurred or distorted, and thus such lenses are in general not suited for recording of real-time images or video sequences. In order to have images of acceptable quality, the recorded image frame rate must not be higher than the lens can reach an equilibrium or stable state between two subsequent images. The same problems occurs for medical treatment applications of such lenses where precise control e.g. of ultrasonic ablation waves radiated towards living tissue is crucial. Thus, using known fluid lenses it is required that the ultrasonic ablation pulse rate is not higher than the lens can reach a stable state between two subsequent pulses.

WO 2006/030328 A1 describes an optical device with a fluid-to-fluid interface with a viscosity selected to provide a critical damping which allows fast switching between two pre-defined shapes of the interface. By selecting the fluids such that critical damping is obtained, oscillations in the interface can be avoided after the switching, thereby allowing the lens to be used quickly after switching has been performed. However, still WO 2006/030328 A1 does not address the issue of real-time recording of images through the optical device.

SUMMARY OF THE INVENTION

It is an object to provide a lens system suited for high quality real-time high speed imaging, such as ultrasonic high speed imaging, during refraction adjustment.

In a first aspect, the invention provides an adjustable lens system including
  a container enclosing a first fluid (F1) arranged with an interface (I) to an electrically susceptible second fluid (F2), wherein the interface (I) is arranged to refract incoming waves, wherein the first and second fluids (F1, F2) are immiscible, wherein the first and second fluids (F1, F2) are selected such that they together exhibit a mechanical damping which is critical or near critical, and wherein a shape of the interface (I) is adjustable upon application of an electric voltage (VC), and
  a control circuit (CC) arranged to generate the electric voltage (VC), wherein the control circuit (CC) is arranged to change the electric voltage (VC) from a first voltage (V1) to a second voltage (V2) different from the first voltage (V1) such that a rate of voltage change is limited to avoid oscillation of the interface (I), thereby adjusting refraction of incoming waves at the interface (I) from a first refraction to a second refraction in a continuous and controlled manner.

By the term 'fluid' is understood a subset of the phases of matter (fluids include liquids, gases, plasmas, gels and, plastic solids), while in the following the term 'liquid' refers to compounds in the liquid state.

By 'interface' is understood the limit between the first and second fluids which may be the first and second fluid being in direct contact, or the interface may include a suitable membrane separating the first and second fluids.

The lens system according to the first aspect is advantageous since it allows recording of high speed images during adjustment of the refraction, e.g. adjustment of focal point or deflection, since the voltage rate is limited such that the refraction changes continuously, preferably both with respect to temporal change and with respect to a spatial change of the interface, i.e. the interface preferably changes its shape in a controlled manner from the first refraction to the second refraction. Thus, all the time during adjustment, the interface takes intermediate shapes that allows high quality imaging during the entire refraction adjustment from the first refraction to the second refraction.

Thus, real-time ultrasonic imaging and real-time ultrasonic ablation can be performed with such lens system utilizing the effect that the lens has a controlled shape during the adjustment procedure and therefore does not suffer from reduced performance during adjustment. Thus, there is no need to stop using the lens during focal point adjustment or the like. This can save time for many applications, such as medical applications where it becomes possible to perform quicker diagnostic ultrasonic imaging examinations, or to perform quicker treatments in case the lens system is used for focusing ultrasonic ablation beams.

The lens system according to the first aspect is based on the insight that the combination of fluid viscosities selected to provide a mechanical damping of the fluids which is critical or at least near critical and the choice of the rate of voltage change for adjusting refraction of the lens results in a lens system which is adjustable at an acceptable speed for high speed imaging purposes. The selection of the fluids such that the damping is critical or near critical is known in the art, e.g. described in WO 2006/030328 A1 and will be further described later.

Depending on the actual materials, dimensions and other design parameters, the skilled person will know how to select a limited rate of voltage change to avoid oscillation of the interface, e.g. by performing a test to observe the behavior of the interface during different rate of voltage changes. This may be done by recording high speed images and observing focus performance of the lens system during the refraction adjustment at different rate of voltage changes. Based on these results the highest rate of voltage change can be chosen that results in a stable focus performance during the change. Further, it is possible: 1) to measure capacitance changes of the lens, 2) to use an interferometer to look at meniscus, and 3) to image through the lens during adjustment, i.e. when the interface is moving, and see when the image becomes blurred.

The control voltage can be adjusted continuously, but it is also possible to use a digitally controlled control voltage, i.e. adjustment of the voltage in steps, provided still that the step size is small enough, that the steps occur fast enough, and the rate of change is limited so as to avoid oscillation of the interface.

Preferably, the lens system is arranged for refraction of incoming waves during adjustment of the refraction from the first refraction to the second refraction.

The control circuit may be arranged to change the electric voltage from the first voltage to the second voltage continuously, such as involving analog circuitry. Alternatively, the control circuit may be arranged to change the electric voltage from the first voltage to the second voltage in a plurality of steps, such as involving digital circuitry.

The lens system is suited for different types of incoming waves, such as light and ultrasonic waves. The first and second fluids are preferably arranged in the container such that the container allows incoming waves to pass through at least one of the first and second fluids in order to be able to be refracted at the interface.

In one embodiment, the container is substantially rotational symmetric around an axis, e.g. the container may have a cylindrical shape. In such embodiment, the first fluid may provide a meniscus shape with the interface having an adjustable spherical shape, or at least the interface has a spherically shaped portion. By 'meniscus shape' is understood a body with one convex and one concave side, wherein curvatures of both sides are equal. It is to be understood that meniscus shape is only meant as an example. Alternative shapes may be a body with two major outer surfaces being a substantially flat surface and a substantially ellipsoidal surface etc. Especially, the shape may be a pinned meniscus shape, i.e. a meniscus shape where at least part of the concave surface is replaced by a substantially flat or linear surface.

In other embodiments, the lens system is arranged for non-rotational symmetric shapes of the interface.

The lens system may be arranged for adjustment of a focal point or for deflection of incoming waves, or for a combination of adjustment of focal point and for deflection of incoming waves.

In preferred embodiments, the first fluid is an oil, e.g. silicone oil, why the conducting second fluid is water, e.g. with an additive to improve the electrically conducting properties.

In a second aspect, the invention provides a method of adjusting a lens, the lens including a container enclosing a first fluid arranged with an interface to an electrically susceptible second fluid, wherein the interface is arranged to refract incoming waves, wherein the first and second fluids are immiscible, wherein the first and second fluids are selected such that they together exhibit a mechanical damping which is near critical or critical, and wherein a shape of the interface is adjustable upon application of an electric voltage, the method including
    applying a first voltage to the lens, and
    changing the electric voltage from the first voltage to a second voltage at a rate of voltage change which is low enough to avoid oscillation of the interface.

In a third aspect, the invention provides an imaging device, including
    an adjustable lens system according to the first aspect, and
    a transducer arranged in connection with the lens system so as to allow imaging of incoming waves refracted by the lens system.

The device according to the third aspect is preferably arranged for imaging during the change of refraction from the first refraction to the second refraction.

In preferred embodiments, the lens system and the transducer are arranged for imaging of ultrasonic waves refracted by the lens system.

The container enclosing the first and second fluids, and the transducer (T) are preferably arranged in connection with a catheter, such as a catheter arranged for medical purposes.

The imaging device may be arranged for medical imaging of living tissue, such as for use in diagnostic examinations.

In a fourth aspect, the invention provides an imaging system including
    an imaging device according to the third aspect, and
    an image processor arranged to receive signals from the transducer, and to process the signals so as to generate images accordingly.

In a fifth aspect, the invention provides a medical treatment device including
    a lens system according to the first aspect, and
    a transducer, e.g. an ultrasound transducer, arranged to generate waves with an energy suited for treatment of living tissue, the transducer being arranged in connection with the lens system so as to allow the generated waves to be refracted by the lens system.

Thus, such medical treatment device utilizes the advantageous effect of the lens system of the first aspect, namely the possibility of using e.g. ultrasonic pulses at high speed during adjustment of e.g. a focal point, hereby allowing ablation along a pre-defined trajectory.

It is appreciated that embodiments and advantages mentioned for the first aspect apply as well for the second, third, fourth and fifth aspects. Further, it is appreciated that the aspects and their embodiments may be combined in any way.

BRIEF DESCRIPTION OF THE DRAWINGS

Embodiments of the invention will be described, by way of example only, with reference to the drawings, in which.

DETAILED DESCRIPTION OF EMBODIMENTS

Figure 1:
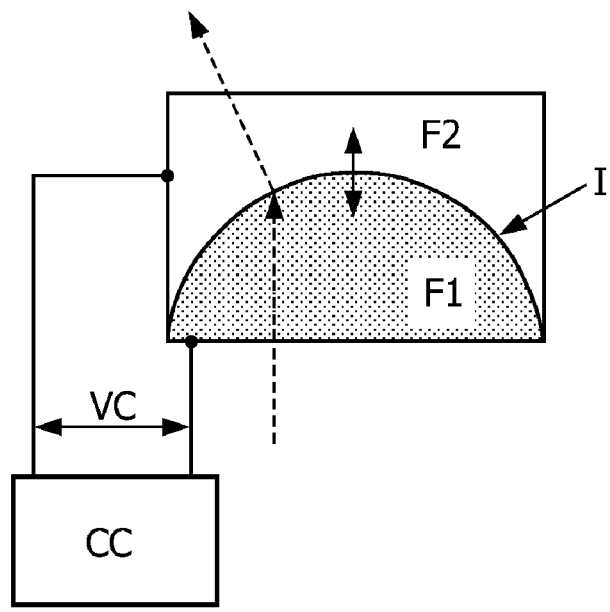
FIG. 1 illustrates a lens system embodiment.

FIG. 1 illustrates a sketch of a lens system embodiment where a first fluid F1 and a second fluid F2 are arranged in direct contact at an interface I, in other words a fluid lens. One fluid should be conductive while the other fluid should be insulating. In the illustrated embodiment, the fluids F1, F2 are arranged in a container such that the interface I has a shape which is rotational symmetric around an axis, namely such that the fluids F1, F2 are arranged in a meniscus shape, with the interface I having a spherical shape. The double-arrow indicates possible movement of the interface I which allows adjustment of the refraction of incoming waves (one ray is illustrates by the dashed arrow). A control circuit CC applies a voltage VC to the lens via electrodes (not expressly illustrated). A first electrode is in contact with the electrically conductive fluid while a second electrode is behind an isolating layer covering the inner wall(s) of the lens. Thus, the lens utilizes the so-called electro-wetting effect to adjust the shape, or more specifically, the curvature of the interface I as a function of the applied voltage VC. For further general information regarding fluid lenses, reference is made to [Appl. Phys. Lett., Vol. 85, pp. 1128-1130, 2004, by Kuiper and Hendriks].

According to the invention the fluids F1, F2 are selected such that the lens is critically damped or at least near critically damped. This may be obtained by selecting the fluids F1, F2 and the dimensions of the lens such that it obeys (1) for critical damping and (2) for near critical damping, $$0.5 \leq 98V\left(\frac{D}{Sd}\right)^{0.5} \leq 5 \qquad (1)$$

$$0.75 \leq 98V\left(\frac{D}{Sd}\right)^{0.5} \leq 2 \qquad (2)$$

In (1) and (2):

V is an averaged kinematic viscosity in $m^2/s$ of the fluids F1, F2,

D is an averaged density in $kg/m^3$ of the fluids F1, F2,

S is a surface tension in N/m that the fluids F1, F2 experience, and d is a diameter in m of the container at a contact line between the interface I and the container.

In preferred embodiments, the first fluid F1 is water, while the second fluid F2 is a silicone oil, and preferably the dimension are selected to allow adjustment of refraction of incoming ultrasonic waves, e.g. ultrasonic waves within the frequency range 100 kHz-100 MHz, such as within the frequency range 1-40 MHz.

As an example, a 4 mm diameter meniscus shaped lens uses a 0.1M KCl solution in water as the conductive liquid, while silicone oil of different viscosities is used as the insulating liquid. At around 10 cSt viscosity for a silicone oil, it is possible to obtain a meniscus which is critically damped. Note that a slightly under-damped lens will actually switch faster than a critically damped one. However, due to the generation of oscillations in the under-damped case, it is still preferred that the lens is critically damped thereby allowing measuring or treating during the adjustment of the lens.

The control circuit CC is arranged to change the voltage VC so as to adjust the refraction of the lens, and the control circuit CC is arranged to change the voltage VC at a rate of voltage change limited so as to avoid oscillation of the interface I during the refraction adjustment. Thus, hereby it is possible to provide a continuous transition from one shape of the interface I to another, thereby allowing the lens to be used for high quality imaging during the entire adjustment of refraction from one value to another. The output driver of the control circuit CC is preferably capable of providing a voltage VC at least in the range 0-200 V. The output driver may be either digital or analog. In case of an analog driver, a continuous output voltage VC is easily obtained, and it is a trivial task to test for a limit for the rate of voltage change that ensures a continuous adjustment of the refraction. E.g. it is possible to sweep the voltage VC between 50 V and 200 V up to at least 10 times per second for typical embodiments.

In case of a digital output stage providing discrete output voltages in steps with a certain resolution, such stage must be capable of providing voltage steps that are small enough to ensure a continuous change of the refraction of the lens. If the output voltage VC at time t is denoted by VC(t), and the next 'step' of the output driver occurs at t+dt, then a requirement for the output voltage VC can be defined as in (3).

$$|VC(t)-VC(t+dt)|<b \qquad (3)$$

Here b is a parameter that reflects the smoothness of the output voltage VC. If dt is of the order of a nanosecond, then b is preferably below one microvolt, however it is appreciated that the actual choice of the parameter b depends on the actual design of the lens system, i.e. fluids, dimension, shape etc. Thus, practical tests to ensure optical quality during may be required to determine a limit for the rate of voltage change to avoid a distorted shape of the interface I during refraction adjustment.

Figure 2:
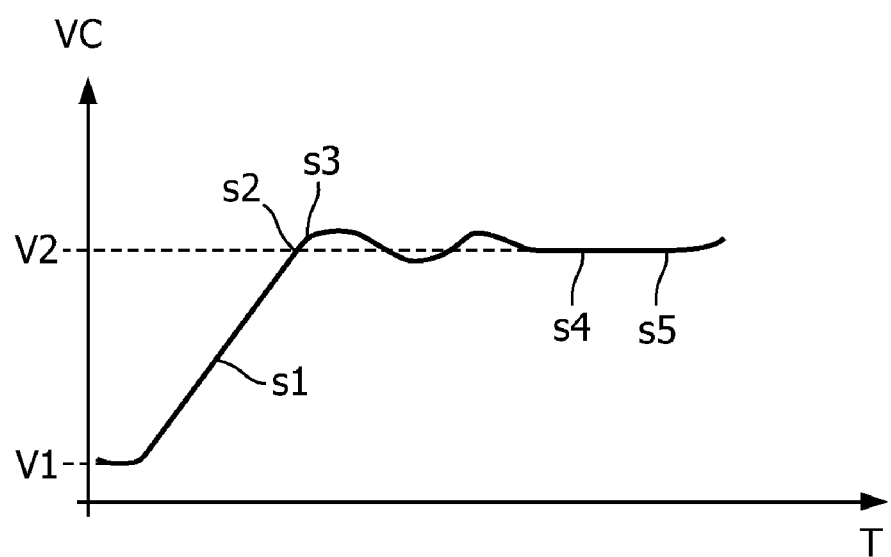
FIG. 2 illustrates an example of a control voltage change for adjustment of focal point.

FIG. 2 illustrates an example of the different phases s1-s5 of adjustment of refraction of the lens and the corresponding voltage VC change as a function of time T during these phases. Starting at an initial voltage V1, the voltage VC is increased in a first phase s1. As seen, in phase s1 the rate of voltage change is limited to a certain maximum, seen by the linear voltage VC change versus time T in this phase between V1 and V2. The slope of this linear increase in voltage VC reflects the chosen maximum rate of voltage change to ensure a quick increase in the voltage VC, while still ensuring that the lens interface does not oscillate during the adjustment. When a desired refraction or focal position of the lens is obtained s2, the voltage change is stopped.

To keep a focal point fixed, a feedback algorithm may be present that allows the change to continue s3, but at a lower rate. If the lens went beyond the desired focal point, the direction of voltage change must be reversed. Preferably this is also done in a smooth way, i.e. without an abrupt change, although an abrupt reversal of the direction of voltage change probably does not lead to severe oscillations; an abrupt change may therefore be allowed. In general terms, it is desirable that the voltage should be changed in such a way that initially, the second derivative with respect to time is non-zero; secondarily, that the second derivative is zero and the first derivative is non-zero; and lastly in a way that a non-zero second derivative will try to counter any overshoot or oscillations as it reaches the final shape. It often will be desirable to choose an endpoint sufficiently past the location where the last ultrasound pulse was fired to avoid artifacts in the imaging or detection techniques. Thus, a small abrupt change is acceptable, but it is desirable but not strictly necessary that no strong accelerative or decelerative component is present. Returning to the example of FIG. 2, at s4 focus has been regained, while at s5 the objects moves out of focus.

In the example of FIG. 2, it is crucial to limit the rate of voltage change such that it is possible to utilize the lens during the entire adjustment procedure, i.e. during all phases s1-s5. Especially, in phase s1 where a large adjustment of the lens is performed, a rate of voltage change limit must be obeyed to ensure that the lens preserves a high quality also during this phase s1. This enables e.g. "on the fly" ultrasonic recording through the lens during adjustment.

As mentioned earlier, the continuous voltage change such as shown in FIG. 2, can be divided into many small voltage steps e.g. in case of a control circuit CC with a output driver. This will not cause severe oscillations when the number of steps is at least as big as 1/damping time. Damping time is dependent on the characteristics of the liquids used and can be of the order of 10 ms. This implies that the number of steps should be at least 100/s, preferably at least twice this number, such as 200 Hz. As a result, for an imaging frame rate of 30 Hz, the number of steps per second will need to be 30*100=3000. Such a kHz-range modulation of the driving voltage VC for the lens is easily reachable with standard function-generators that are widely available nowadays.

The voltage time-gradient should be limited to a maximum determined by the voltage difference between two imaging frames divided by the time interval between the frames. This claim should not apply if the interval is divided into more than 2 voltage steps (e.g. in case of a digital driving, generating many small steps).

Figure 3A:
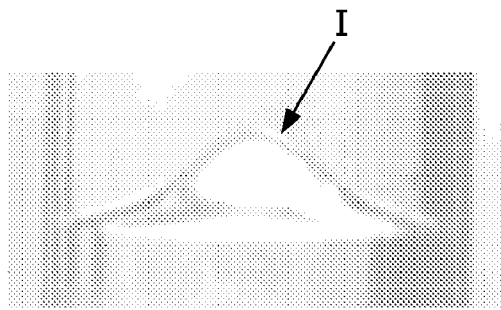
FIGS. 3a and 3b illustrates photos of interface shapes of the same lens, with and without oscillation.
Figure 3B:
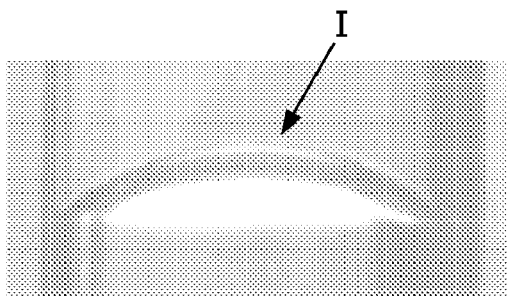

FIGS. 3a and 3b illustrate photos of the interface I of the same lens in different situations. In FIG. 3a the interface I of the lens is seen to have an irregular shape as a response to an abrupt change in the control voltage such as in prior art, since the interface I oscillates, and it is evident that momentary interface I shape illustrated in FIG. 3a will result in severely distorted image, if images are recorded through the lens at that moment in time. In FIG. 3b the same interface I is illustrated during operation according to the invention, and here the interface I is seen to have a smooth spherical shape which will ensure controlled optical properties of the lens during adjustment.

Figure 4:
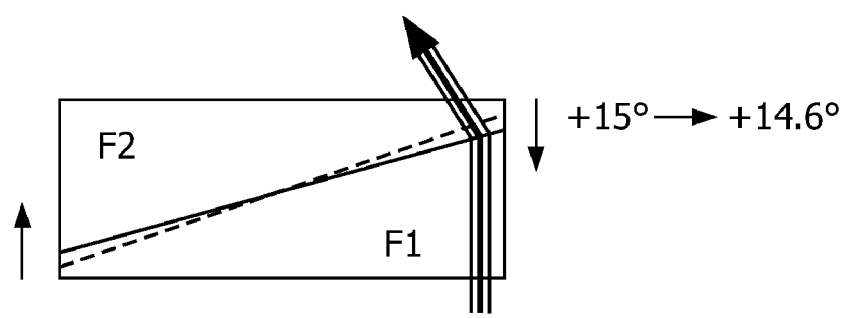
FIG. 4 illustrates an example of off-axis imaging.

FIG. 4 illustrates movement of a meniscus shaped lens embodiment suited for off-axis imaging, and in the following conditions are described such as to ensure that the speed of change of the meniscus is sufficiently low to allow pulse echo imaging during adjustment of the lens. In FIG. 4 movement of the meniscus interface is going from the dotted line to the solid line while remaining flat. Indicated by the small arrows is the direction of movement of the meniscus, and indicated by the thick arrow is the refraction of the ultrasound on the meniscus interface.

A typical pulse echo signal will take roughly 100 μs to propagate into and back out of the tissue. This means the time until the next firing is (at least) 100 μs. The intrinsic speed limit of a fluid type lens (~100 Hz, given by the ~10 ms for switching the meniscus between two configurations) means that imaging at reasonable speeds requires careful considerations. To obtain this, a meniscus configuration is chosen such that the meniscus will have an interface which remains flat all the time during adjustment. When such a meniscus is placed in front of an ultrasound transducer array, the deflecting properties of the meniscus allows off-axis measurement or imaging. This implies that, when a 1D array is used and tilts off-axis to a series of different directions, a 3D ultrasound image can be constructed.

A single pulse echo measurement takes 100 μs and there is no dead time between subsequent measurements. Furthermore, moving the meniscus from one extreme position ("tilting far to the left") to the other one ("tilting far to the right") will take 10 ms. This means that 100 pulse echo measurements can be taken in the time it takes for the meniscus to move between the extremes. Since the meniscus interface will remain flat, through the requirement of being critically damped, a motion blur introduced by the moving of the meniscus interface should be estimated. For a reasonable embodiment, the orientation of the meniscus can be set to go from +15° to −15° during the available 10 ms. In worst-case the meniscus is tilted maximally +15°, and ultrasound is considered passing through the outer edges of the meniscus interface.

For 1D ultrasound arrays, the geometry is such that the lens is typically 5 mm in elevation and 12 to 29 mm in lateral direction. However, as the tilt angle of the meniscus will only vary in the direction of the short axis, the speed of the moving meniscus will be exclusively determined by the short axis. Therefore, typical size can be chosen comparable with a 1D ICE catheter array: a diameter of 5 mm.

At +15° angle for the meniscus (the maximal deflection angle), a corresponding height will be 5*tan [15°]=1.34 mm. Note that this height is measured from the center of the meniscus (i.e.: it goes down as much as it does up). The next pulse echo measurement will take place after the meniscus is moved 30°/100=0.3°. At +14.6° angle for the meniscus, this works out to a height of 5*tan [14.6°]=1.30 mm. Therefore, at the outer edges of the container (where movement of the meniscus is largest), the meniscus moves vertically about 40 μm. This is the key number: <40 μm movement between subsequent pulse echo measurements.

At typical ultrasound frequencies, this means that at the outer edges the meniscus still only move on the order of a tenth of a wavelength λ. The diffraction limit is given by the λ/(2*NA2), where NA refers to the numerical aperture of the lens, and thus movements are of the order of λ/10. As NA<<√5, most likely even NA<0.1, this implies that during the movement of the meniscus, the system remains diffraction limited. As a result, it is possible to do diffraction limited ultrasound imaging, while the meniscus is moving. Note that it is relatively easy to reduce meniscus movement even further by simply choosing a lens with a smaller diameter.

The invention has a number of medical application possibilities, especially with respect to embodiments arranged for ultrasonic signals, both in the minimally invasive as well as in the extra-corporeal field. The following is a highlight of a few examples of such applications, where the advantageous effect of the inventive lens system is utilized, i.e. the possibility of a vast number of lens movements during a short period of time (e.g. due to the requirement of obtaining real-time imaging data):

1) Imaging applications—even when using a lower transducer count (i.e.: few elements or 1D array), the invention allows generation of 2D or 3D ultrasonic images. This is of benefit in the minimally invasive field, where space is a strong limitation. Also, reducing the transducer count will reduce price. This will bring low-cost 3D ultrasonic imaging into reach, as currently such 2D transducer arrays and their associated cabling, interconnects and driving circuitry may be too expensive for the disposable market.

2) Treatment applications—using a single-element high-power ultrasound transducer and a lens system according to the invention, it becomes possible to electronically steer the focal spot, i.e. ablation spot. This will allow a practitioner to "map" out a predetermined trajectory without the continuous and very cumbersome catheter-repositioning that is currently required. Also extra-corporeally, this will allow for faster and a more-controlled treatment procedures.

3) Flow monitoring and detection applications—using the lens system according to the invention, it is possible to measure the flow (e.g. blood flow through Doppler motion detection or blood volume flow rate) at a well-defined measurement position. As this measurement position will vary when moving the lens, this will allow comparison of movement characteristics at different positions to optimize signal to noise. Furthermore, in the minimally invasive field, it becomes possible to measure the blood flow inside an aneurysm as compared to in a normal vein. From such comparisons, a specialist will be able to diagnose the type of aneurysm and determine the adequate treatment. In the case of traditional Doppler, the device would allow the measurement of flow at two or more preset angles to compensate better for angular position of the transducer to the flow.

4) Motion monitoring and detection applications—since the measurement position can vary—an organ boundary may be identified and the focus adjusted about the boundary. For example, this could be used to track the position of a diaphragm or liver boundary in the body for real-time breathing tracking. The motion tracking information could be used a) during CT or MR image acquisitions to correct for motion in the scans (i.e. replace time-costly MR navigators that hinder the temporal acquisition of MR scans) or b) during interventions, pre-operative MR or CT scans are collected with ultrasound motion information—then the pre-operative scans can be re-synchronized to the patient's real-time breathing pattern in the operating room and provide more useful information to the clinician. The lens system according to the invention allows for a moving focus to aid in identifying useful organ boundaries and then adaptively changes focus for best motion.

The invention can be used in any application or algorithm for employing electro-wetting type of lenses in combination with ultrasound where one wishes to use the lens, e.g. meniscus shaped, during movement to manipulate ultrasound in order to obtain sufficient imaging/treatment speeds. Note especially that, both in the minimally invasive field as well as extra-corporeally, this will be the only viable way that high-frame rate 2D/3D ultrasonic imaging can be obtained using a substantially lower transducer count as compared to traditional ultrasound arrays.

Figure 5:
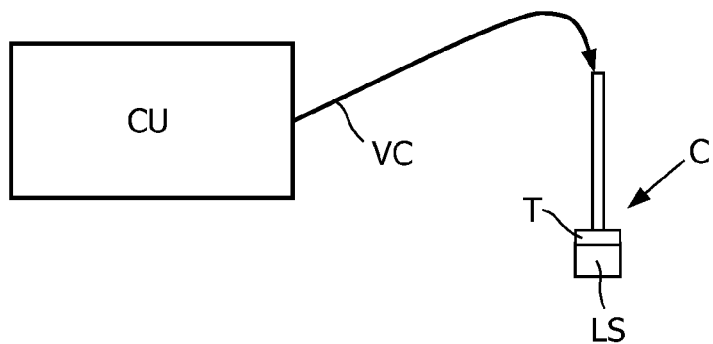
FIG. 5 illustrates an imaging device embodiment.

FIG. 5 sketches a medical ultrasound imaging device embodiment. A fluid lens LS as described above is mounted in connection with a transducer T, or transducer array, arranged to sense ultrasound signals refracted through the lens LS. The lens LS and the transducer T are positioned at an end of a catheter C. The lens LS is connected to a control unit CU that generates a voltage VC for adjustment of the lens LS via a cable through the catheter C.

Figure 6:
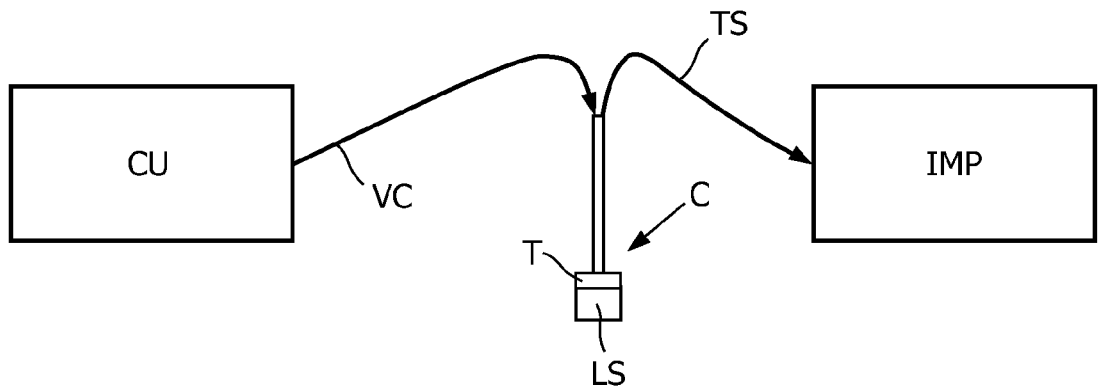
FIG. 6 illustrates an imaging system embodiment.

FIG. 6 sketches a medical ultrasound imaging system. A device as illustrated in FIG. 5 has its transducer T, or transducer array, connected to an image processor IMP via a cable in through the catheter C so as to provide a transducer signal TS to the image processor. The image processor IMP processes the transducer signal TS and provides an image or image sequence in response.

Figure 7:
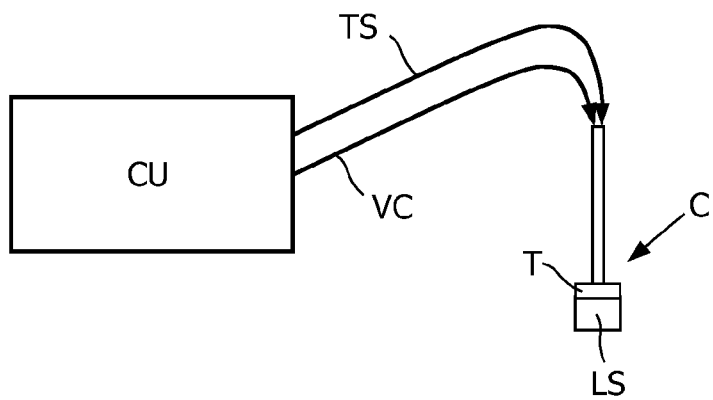
FIG. 7 illustrates a medical device embodiment.

FIG. 7 sketches an example of a medical treatment device in the form of an ultrasonic ablation device including a control unit CU connected via cables through a catheter C to provide an electric ultrasound driver signal TS to an ultrasound transducer T, or array of transducers, and to provide a control voltage VC to a lens LS so as to allow adjustment of focal point of the lens LS. The lens LS and transducer are arranged at an end of the catheter C such that ultrasound waves generated by the transducer T are refracted by the lens LS such that a focused ultrasound pattern can be applied to a desired spot of living tissue thereby allowing ablation. With the lens system LS arranged such as described above, it is possible to perform continuous ablation during adjustment of the lens LS, and thus ablation can be performed following a trajectory much faster than if the ablation process has to be stopped during lens LS adjustment, thereby significantly reducing treatment time.

To sum up, the invention provides an adjustable fluid type lens system is provided that allows e.g. ultrasound imaging through the lens during adjustment of the lens. The lens includes a container enclosing two immiscible fluids, e.g. water and oil, being in contact with each other at an interface. Incoming waves are then refracted at this interface. The shape of the interface, and thereby the refraction property, is adjustable by adjusting a voltage applied to the lens. The two fluids are selected such that they together exhibit a mechanical damping which is critical or near critical. A control circuit generates the electric voltage for adjusting the refraction from one value to another, the control circuit being arranged to change the electric voltage such that a rate of voltage change is limited to avoid oscillation of the interface, thereby adjusting refraction of incoming waves at the interface in a continuous manner. This makes it possible to use the lens while it is during adjustment from one refraction value to another, since the interface shape will at all time during the adjustment have a controlled shape. The voltage can be either a continuous voltage or a discrete stepwise (digital) voltage which is just controlled with respect to step size and temporal extension of the steps. The lens system has a number of applications e.g. within the medical field, e.g. for "on the fly" high speed ultrasound imaging, or for ultrasound ablation applications where ablation can be performed during adjustment of the lens to follow a pre-defined trajectory.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. An adjustable lens system including
a container enclosing a first fluid (F1) arranged with an interface (I) to an electrically susceptible second fluid (F2), wherein the interface (I) is arranged to refract incoming waves, wherein the first and second fluids (F1, F2) are immiscible, wherein the first and second fluids (F1, F2) are selected such that they together exhibit a mechanical damping which is critical or near critical, and wherein a shape of the interface (I) is adjustable upon application of an electric voltage (VC), and
a control circuit (CC) arranged to generate the electric voltage (VC), wherein the control circuit (CC) is arranged to change the electric voltage (VC) from a first voltage (V1) to a second voltage (V2) different from the first voltage (V1) such that a rate of voltage change is limited to avoid oscillation of the interface (I), thereby adjusting refraction of incoming waves at the interface (I) from a first refraction to a second refraction in a continuous and controlled manner.

2. Lens system according to claim 1, arranged for refraction of incoming waves during adjustment of the refraction from the first refraction to the second refraction.

3. Lens system according to claim 1, wherein the control circuit (CC) is arranged to change the electric voltage (VC) from the first voltage (V1) to the second voltage (V2) continuously.

4. Lens system according to claim 1, wherein the control circuit (CC) is arranged to change the electric voltage (VC) from the first voltage (V1) to the second voltage (V2) in a plurality of steps.

5. Lens system according to claim 1, wherein the container is substantially rotational symmetric around an axis.

6. Lens system according to claim 5, wherein the first fluid (F1) provides a meniscus shape, and wherein the interface (I) has an adjustable spherical shape.

7. Lens system according to claim 1, arranged for non-rotational symmetric shapes of the interface (I).

8. Lens system according to claim 1, arranged for adjustment of a focal point of incoming waves.

9. Lens system according to claim 1, arranged for deflection of incoming waves.

10. Lens system according to claim 1, wherein the first fluid (F1) is an oil and the second fluid (F2) is water.

11. Lens system according to claim 1, wherein the first and second fluids (F1, F2) are selected according to one of:

$$0.5 \leq 98V\left(\frac{D}{Sd}\right)^{0.5} \leq 5, \text{ and } 0.75 \leq 98V\left(\frac{D}{Sd}\right)^{0.5} \leq 2,$$

wherein V is an averaged kinematic viscosity in m$^2$/s of the first and second fluids (F1, F2), D is an averaged density in kg/m$^3$ of the first and second fluids (F1, F2), S is a surface tension in N/m that the first and second fluids (F1, F2) experience, and d is a diameter in m of the container at a contact line between the interface (I) and the container.

12. Method of adjusting a lens, the lens including a container enclosing a first fluid (F1) arranged with an interface (I) to an electrically susceptible second fluid (F2), wherein the interface (I) is arranged to refract incoming waves, wherein the first and second fluids (F1, F2) are immiscible, wherein the first and second fluids (F1, F2) are selected such that they together exhibit a mechanical damping which is near critical or critical, and wherein a shape of the interface (I) is adjustable upon application of an electric voltage (VC), the method including applying a first voltage (V1) to the lens, and changing the electric voltage (VC) from the first voltage (V1) to a second voltage (V2) at a rate of voltage change which is low enough to avoid oscillation of the interface (I).

13. Imaging device including an adjustable lens system (LS, CU) according to claim 1, and a transducer (T) arranged in connection with the lens system (LS, CU) so as to allow imaging of incoming waves refracted by the lens system (LS, CU).

14. Imaging device according to claim 13, wherein the device is arranged for imaging during the change of refraction from the first refraction to the second refraction.

15. Imaging system including an imaging device (LC, CU, T) according to claim 13, and an image processor (IMP) arranged to receive signals (TS) from the transducer (T), and to process the signals (TS) so as to generate images accordingly.

* * * * *